(12) United States Patent
Bühlmann

(10) Patent No.: US 6,307,927 B1
(45) Date of Patent: Oct. 23, 2001

(54) METHOD FOR OPERATING A NETWORK WITH INTERCONNECTED TERMINALS

(75) Inventor: Adrian Bühlmann, Aarau (CH)

(73) Assignee: Siemens Schweiz AG, Zurich (CH)

( * ) Notice: Subject to any disclaimer, the term of this patent is extended or adjusted under 35 U.S.C. 154(b) by 0 days.

(21) Appl. No.: 09/147,701

(22) PCT Filed: Jun. 24, 1998

(86) PCT No.: PCT/CH98/00277

§ 371 Date: Feb. 19, 1999

§ 102(e) Date: Feb. 19, 1999

(87) PCT Pub. No.: WO99/01977

PCT Pub. Date: Jan. 14, 1999

(30) Foreign Application Priority Data

Jun. 30, 1997 (CH) .................................................. 1569/97

(51) Int. Cl.$^7$ .................................................. H04M 3/42
(52) U.S. Cl. ............................... 379/204.01; 379/202.01; 379/207.01
(58) Field of Search .................................. 379/202, 207, 379/202.01–207.01

(56) References Cited

U.S. PATENT DOCUMENTS

| | | | | |
|---|---|---|---|---|
| 3,912,874 | * | 10/1975 | Botterell et al. | 379/201 |
| 5,210,794 | * | 5/1993 | Brunsgard | 380/9 |
| 5,369,694 | * | 11/1994 | Bales et al. | 379/206 |
| 5,373,549 | | 12/1994 | Bales et al. | 379/93 |
| 5,483,588 | | 1/1996 | Eaton et al. | 379/202 |
| 5,590,127 | * | 12/1996 | Bales et al. | 370/260 |

FOREIGN PATENT DOCUMENTS

| | | |
|---|---|---|
| 0604046 | 6/1994 | (EP) . |
| 0604053 | 6/1994 | (EP) . |
| 0664636 | 7/1995 | (EP) . |

OTHER PUBLICATIONS

E. Haszto et al., "Alliance–Teleconferencing Services Boost Business Efficiency," *AT& T Technology*, Bd. 3, Nr. 1, pp. 22–31, Short Hills (US), (1988).

* cited by examiner

Primary Examiner—Ahmad Matar
Assistant Examiner—Hector Agdeppa
(74) Attorney, Agent, or Firm—Herbert L. Lerner; Laurence A. Greenberg; Werner H. Stemer

(57) ABSTRACT

The invention relates to a process for the operation of a network with terminals (EG1, . . . , EGm) that can be connected to each other via transmission nodes (K1, . . . , Km) of the network, whereby, with the existence of a connection between two terminals, other terminals, accordingly authorized, can link into this connection. If one terminal (EG1) of the terminals (EG1 to EG6), sharing the connection, wants to maintain a connection with only one terminal (EG2) and wants to separate the other terminals (EG3 to EG5) from the connection, this terminal (EG1) sends out a corresponding request to all transmission nodes (K1, . . . , K5) that are part of the interlinking network, which is made up of the terminals (EG1 to EG6). After receipt of the request, each transmission node of the interlinking network sends back a corresponding confirmation to the transmission node from which it received the request. Thereby, a transmission node sends back a confirmation to the transmission node from which it received the request only when it has received a confirmation from all transmission nodes to which it sent a request. After the arrival of the confirmation in the transmission node (K1), assigned to the terminal (EG1) sending out the request, this transmission node (K1) sends a request for the disconnection of the respective terminal (EG3 to EG6) to the other transmission nodes (K2 to K5), upon which the transmission nodes (K1, K2, K4, K5), assigned to the terminals (EG3 to EG6) to be disconnected, disconnect these terminals from the interlinking network.

16 Claims, 3 Drawing Sheets

METHOD FOR OPERATING A NETWORK WITH INTERCONNECTED TERMINALS

BACKGROUND OF THE INVENTION

Telecommunication switching systems exist in which other authorized participants enter into a connection between two participants and are thereby able to listen in and participate in the conversation. This feature of performance is in particular desired in systems for traders or personal secretaries. Trader systems are predominantly used in banks, for, e.g., exchange dealings. In such applications it is often desirable for two of the participants in the connection to temporarily speak to each other confidentially and therefore all other participants of the connection have to disconnected from this connection and then again be linked in at a later point in time. The disconnection can be initiated by any participant of the respective connection. The disconnected participants are placed in a hold state so that he or she can be linked back into the connection by one of the two participants still connected to the connection. During disconnection, the connection to the terminals of the disconnected participants is therefore not terminated definitively; only the listening and speaking circuits are disconnected from the connection.

The aim of the present invention is to state a method that ensures a reliable and clear the present invention provide for reliable and clear.

This task is solved by the features listed in the characterizing portion of patent claim 1 or patent claim 2. Preferred embodiments of the invention are listed in additional claims.

The method in accordance with the invention allow network of terminals, that can be connected via nodes, to exclusively leave two selected terminals of a large number of terminals that are temporarily linked to each other and make up the interlinking network, in the connection upon the request of any terminal and to temporarily disconnect the remaining terminals from the interlinking network. For this, no overriding station that controls this procedure is required in the network so that nodes of the same type can be implemented in the network without any exception. The network can thereby be easily complemented with additional nodes of the same type.

BRIEF DESCRIPTION OF THE DRAWING

The invention is described in the following as an example with the aid of drawing, wherein.

DETAILED DESCRIPTION OF THE EXEMPLARY EMBODIMENT

Figure 1:
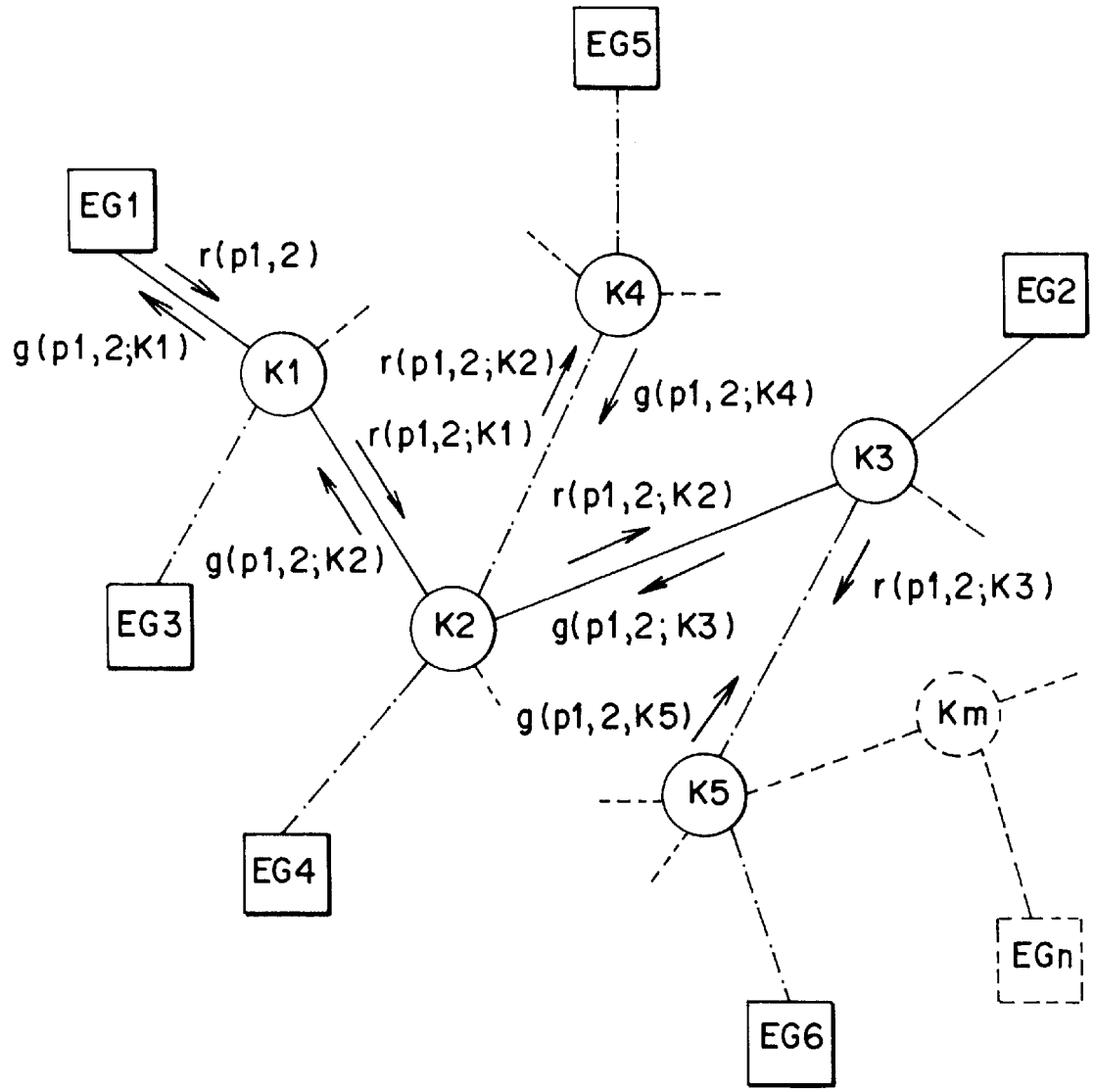
FIG. 1 shows a first interlinking network constructed of inter-connected terminals.

FIG. 1 shows a network, for example, a telecommunications network, with terminals EG1 . . . EGn that can establish a connection with each other via switching nodes K1 . . . KM, terminals can be connected directly to the nodes. Terminals are understood here as telephones, for example. The transfer of the information required for establishing and switching off a connection each occurs via a signaling channel, whereas user information is transmitted over a bi-directional data signal channel. To explain the invention, one shall assume by way of non-limiting example that a speech connection exists between terminal EG1 and terminal EG2. This connection is directed over the nodes K1, K2, and K3 of the network. It is furthermore assumed that the additional terminals EG3 to EG6 have joined this connection and are therefore able to participate in the conversation between terminals EG1 and EG2. The nodes K1 to KS and the terminals EG1 to EG6 therefore make up an interlinking network over which the participants at the terminals EG1 to EG6 can communicate with each other. In each of the nodes of the interlinking network, a conference is created by adding the data signals arriving from different directions, subtracting its own data signal and transferring the results into the different directions. Each of the participants participating in the interlinking network thereby hear all of the other participants sharing the interlinking network but not himself or herself.

If one of the terminals EG3 to EG6 wants to enter the connection between the terminals EG1 and EG2, the respective participant has to actuate the key "enter" on his terminal, upon which the corresponding node establishes the connection between the terminal and the existing connection between terminals EG1 and EG2 in accordance with the adove mentioned principle of establishing conferences. A signal is sent to the two terminals EG1 and EG2 when another terminal has entered into their connection.

If a participant of terminals EG1 to EG6 now desires to temporarily confidentially converse with with only one of the other participant, the other terminals sharing the connection have to be excluded from listening or participating for a desired period of time. The participant at terminal EG1, for example, who originally had only been connected to the participant at terminal EG2, wishes to conditionally speak only with the participant at terminal EG2. For this exclusive connection between terminals EG1 and EG2 terminals EG3 to EG6 must be disconnected from the connection such that they can afterwards be easily linked back alter the need for discretion. The temporary disconnection of terminals EG3 to EG6 is initiated by the appropriately authorized terminal EG1, whereby the participant activates a "privacy" function on his or her terminal EG1 with which terminal he or she wants to talk with exclusively a message corresponding to this function is sent from the terminal EG1 to the assigned node K1.

This message can have the form (p1,2). Where "r" stands for the type of message (request), "p" for the type of request (privacy), "1" for the identification of the requesting station in the network (terminal EG1), and "2" for the identification of the station (terminal EG2) of the network that should stay connected.

The node K1—store the requesting node in message sends a message r(p 1,2;K1) to the adjacent node K2. "K1" is added to the message to identify the requesting node K1. Store the requesting node in memory and sends a message r(p 1,2;K2) to each of the adjacent nodes K3 and K4. Node K3 finally sends a message r(p 1,2;K3) to node K5 in the same manner. All nodes K1 to K5 sharing the interlinking network thereby receive the "privacy" request that was sent from terminal EG1. It is noted that the interlinking network is free of loops and consists of the connections illustrated with continuous and dash-dotted lines in FIG. 1. the interlinking network shown in FIG. 1, an interlinking network is also conceivable in which other nodes are present that do not exhibit any terminals sharing the interlinking network, i.e. nodes that act as transit nodes.

Each node that receives a privacy request and is able to disconnect a terminal connected to it, sends a corresponding confirmation back to the node from which it received the request. The return message each begins with end nodes of interlinking network. Thus node K5 sends a message g(p 1,2;K5) back to the privacy node K3 from which it previously received the request r(p 1,2;K3).

In the message g(p 1,2;K5) "g" signifies the type of message (confirmation), "p" the type of the confirmed request (privacy), "1" the identification of the requesting station (terminal EG1), "2" the identification of the station (terminal EG2) that is to remain in the connection and "K5" the node from which the confirmation originates.

The node K3 that previously sent the message r(p 1,2;K2) to node K5 and is therefore waiting for a response from node K5, registers the input of the message g(p 1,2;K5) from node K5. Each node of the interlinking network that sent a request to another node monitors whether or not a response (confirmation) arrives from this node within a certain period of time. This can be done with a timer that start in the node every time a message is sent out.

If an expected confirmation does not arrive within the period of time, cannot establish a confidential connection with terminal EG2, because the node K1 ultimately does not receive a confirmation within a predetermined, period of time either. In this case, node K1 will send an appropriate signal to alert the user at terminal EG1.

After receipt of confirmation from node K5, the node K3 in turn sends out a message g(p 1,2;K3) back to the node K2. A message g(p 1,2;K4) is received by node K4 in the same manner by the node K2. The node K2, in contrast to node K3, waits for two confirmations before it can send a confirmation to the node K1. After the receipt and confirmation from nodes K3 and K4, the node K2 sends a confirmation g(p 1,2;K2) back to the node K1. The node K1 thereby knows that the "privacy" request, sent from terminal EG1, for an exclusive connection was successful and the interlinking network can therefore transferred into a state in which the terminal EG1 is, only connected to terminal EG2. The node K1 sends a request/message ok(p 1,2) which reaches the nodes sharing the interlinking network, disconnecting the respective terminals as a result. Node K5 disconnects the connection to terminal EG6 in this manner due to the received message ok(p 1,2). The terminal EG6 is thereby placed in a holding state, whereby the connection between the node K5 and the terminal EG6 can be re-activated at a later point in time.

The user at terminal EG6 is notified of the disconnected. The disconnection of terminals EG3, EG4, and EG5 in the nodes K1, K2, and K4 and the display of the holding state in the terminal occurs in the same manner.

The executed disconnection of the terminals EG3 to EG6 is displayed to the terminal EG1 by a return message from nodes K2 to K5, arriving in node K1, so that the participant at terminal EG1 knows that the line is secure and confidential optionally, nodes K1 to K5 can advise (and/or display on) terminals EG3 to EG6 of the confidential States between terminal EG1 terminals EG3 to EG6.

The following rule is categorically valid for the entry of the requests into the interlinking network: if a node has received a request to disconnect terminals that are listening and or participating in the conversation independent from whether or not these requests originate from a another node or from another terminal connected to the node, it rejects later requests for an exclusive connection of terminals connected directly to it, as long as the first request is effective, i.e. the first request is not invalidated by a terminal remaining in the connection or as long as the timer has not expired while waiting for a confirmation.

As soon as the confidentiality is no longer required, one of the participants of the exclusive connection (either EG1 or EG2) can send a lift privacy message from its terminal, which again reaches the nodes K1 to K5. The terminals EG3 to EG6, disconnected previously from the interlinking network, return from the hold state to active participation by the corresponding node.

The participants of terminals EG2 to EG6, instead of the participant with terminal of coarse user of terminals EG5 to EG6 can likewise disconnect terminal establish an exclusive connection with a certain other terminal, if they have the proper authorization.

In the adove described process, several terminals sharing an interlinking network and belonging to different nodes can send off a request for an exclusive connection virtually at the as a result several conflicting requests arrive shortly after one another in a node of the network. The problem of which request the node should choose therefore arises in the node. "Shortly after one another" is defined or request sent from a terminal reaches the interlinking network via the corresponding node before a request, sent earlier from another terminal of another node has reached the node of the first-mentioned terminal in the manner described with the aid of FIG. 1. At this point in time the interlinking network has not yet adjusted to one of these requests, i.e. it has not reached the state in which a certain request has produced any exclusive connections. As a result, the different requests collide somewhere in the interlinking network. The solution to the conflict is described with reference to of FIG. 2.

Figure 2:
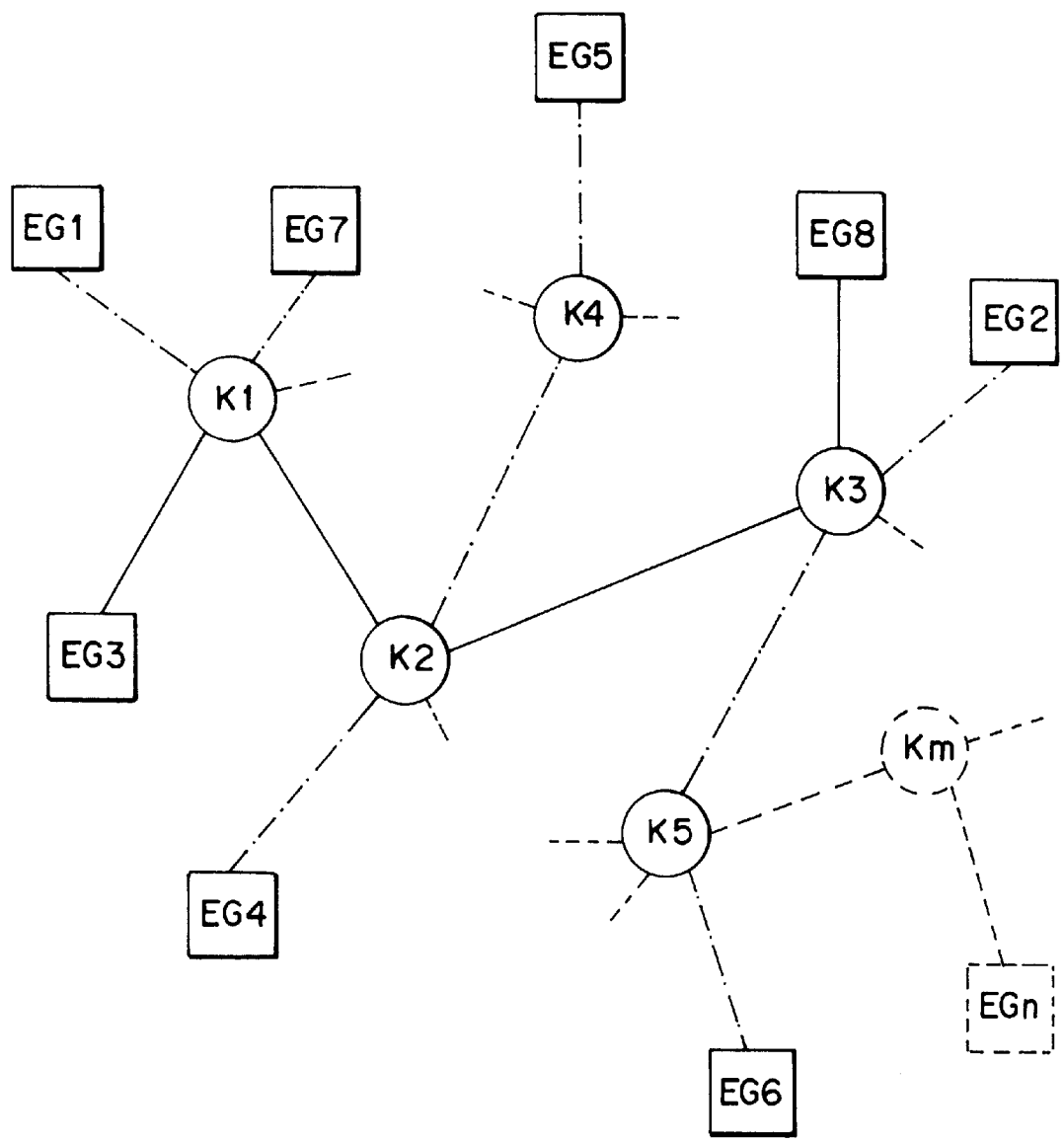
FIG. 2 shows a second interlinking network constructed of inter-connected terminals.

FIG. 2 shows an interlinking network, which exhibits a structure that corresponds to the interlinking network described in FIG. 1, and which is constructed by interlinking terminals EG1 to EG8. The additional terminals EG7 and EG8 are assigned to the nodes K1 or K3, respectively.

It is assumed that the terminal EG7 wants to establish a temporary exclusive connection with the terminal EG4 and, as a result, disconnects the remaining terminals EG1 to EG3, EG5, EG6, and EG8 from the interlinking network. In principle this occurs in the same manner as described with the aid of FIG. 1. For a better overview, the message flow is illustrated separately in FIG. 3 in a message diagram. The process over time occurs by reading the diagram from the top to the bottom. The terminal EG7 sends a request r(p 7,4) to the node K1, which in turn sends a request r(p 7,4;K1) to the node K2. Node K2 sends the request r(p 7,4;K2) to the node K3 as well as the node K4.

Shortly before the node K3 receives the request r(p 7,4;K2) from node K2, another request r(p 8,3) is received from terminal EG8 by the node K3 because this terminal desires an exclusive connection with the terminal EG3. The node K3 thus receives two conflicting requests r(p 8,3) and r(p 7,4;K2) shortly after one another. This conflict has to be resolved since only one exclusive connection between two terminals is possible among a large number of terminals sharing the interlinking network.

Each node of the interlinking network that gets into such a conflict has to decide for one request. One possibility exists in letting the node decide based on a rank of the requesting terminals, for example the requesting terminal with the higher number. number. In the same manner, the number of the partner terminal of the exclusive connection can also be used. It is important that all conflicts occurring in the interlinking network are treated in each node in accordance with the same criteria.

In the present example the node K3 decides /as do all other nodes in such case of conflict for the request that originates from the terminal with the higher number, i.e. for the request r(p8,3). It therefore ignores the request r(p 7,4;K2) arriving later and only processes the request r(p 8,3) further.

If, in another example, the request r(p 8,3) had arrived after the request r(p 7,4;K2) in the node K3, the node K3 would use the rule mentioned above in the example in accordance with FIG. 1, i.e a node that has already received a request rejects a later request from terminals directly connected to it. As a result, the node K3 would reject the request r(8,3)—as well as other requests of terminals connected to it—independent of the number of the requesting terminals and would further process the request r(p 7,4;K2) that arrived first.

In the present case, however, where the node K3 further processes the request r(p 8,3) of the terminal EG8, the node K3 sends to the node K5 a request r(p 8,3;K3). The node K3 furthermore sends a request r(p 8,3:K3) to the node K2. The node K2 determines that the request r(p 8,3;K3) is in conflict with the request r(p 7,4;K1) received earlier from the node K1, It select request r(p 8,3 ;K3) of the terminal EG8 based the higher number than terminal EG7. In accordance therewith, the node K2 sends one request r(p 8,3;K2) each to the node K1 and the node K4, and "forgets" everything associated with the earlier request r(p 7,4;K1).

The node K4 determines that the received request r(p 8,3;K2) stands in conflict with the earlier request r(p 7,4; K2) and decides to forward the later request r(p 8,3;K2) using the noted criterion. The earlier request r(p 7,4;K2) is therefore likewise dropped by the node K4.

The node K1 likewise determines that the request r(p 8,3;K2) conflicts with the earlier request r(p 7,4) and decides to further process the request r(p 8,3;K2). As a result, the node K1 sends a confirmation g(p 8,3;K1) to the node K2, which in turn sends a confirmation g(p 8,3;K2) to the node K3 after it has received the confirmation g(p 8,3;K4) from the node K4. The confirmation g(p 8,3;K4) replaces the confirmation g(p 7,4;K4) indicated earlier at the node K2 from the node K4 to the request r(p 7,4;K2), sent from the node K4 to the node K2. The node K5 furthermore sends a confirmation g(p 8,3;K5) to the node K3 (the Thus the confirmation is present in node K3—the entry node for the request r(p 8,3) of the terminal EG8)—so that the desired temporary exclusive connection of the terminal EG8 with the terminal EG3 can be established. With the arrival of the confirmation from the nodes K2 and K5 in the entry node K3 of the request r(p 8,3) the interlinking network has reached a stable state, illustrated in FIG. 3 with "E", where the request originating from terminal EG8 prevailed in the network. The conflict occurring in nodes K1 to K4—illustrated in FIG. 3 with "W")—between the requests r(p 8,3) and r(p 7.4) were each decided in favor of request r(p 8,3) by using the above described criteria. The desired exclusive connection can now be established from this state.

For this, the node K3 sends a message ok(p 8,3) to the nodes K2 and K5, sharing the interlinking network, which then disconnect the respective terminals. The node K5 thus disconnects its connection to terminal EG6 due to the message ok(p 8,3;K3) received from K3. The terminal EG6 is thereby placed into a hold state from which the connection between the node K5 and the terminal EG6 can be activated at a later point in time. The disconnection is signaled to the terminal EG6 and displayed at that location. The node K2 receives a message ok(p 8,3;K3) from node K3 in the same manner and disconnects the terminal EG4. The node K4 receives the message ok(p 8,3;K2) from node K2 and disconnects the terminal EG5. The node K1 receives the message ok(p 8,3;K2) from the node K2 and disco nnects the terminals EG1 and EG7. The terminal EG2 is disconnected from the interlinking network by the node K3. The terminal EG8 is, as desired, exclusively connected with the terminal EG3.

The executed disconnection of the terminals EG1, EG2, and EG4 to EG7 can be displayed at the terminal EG8 due to a return message arriving in node K3 from nodes K1, K2, K4, and K5. The user of the terminal EG8 thereby knows that the desired confidentiality exists and he or she can act accordingly. Optionally, the nodel K1 to K5 advise the disconnected terminals EG1, EG2, and EG4 to EG7 that a confidential connection has been established from terminal EG8 to EG3. The existence of the exclusive connection between the terminals EG8 and EG3 can then be displayed in the terminals EG1, EG2, and EG4 to EG7, so that the affected user are informed about their holding state.

As soon as the confidentiality is no longer necessary, one of the two participants can send a message "lift privacy" from his or her terminal EG3 or EG8, which again reaches the nodes K1 to K5. The terminals EG1, EG2, and EG4 to EG7, can again participate with the aid of the respective nodes.

Of course any of the other participants at the terminals EG1 to EG7 taking part of the interlinking network can establish an exclusive connection with another terminal, (if they are properly authorized.)

Figure 3:
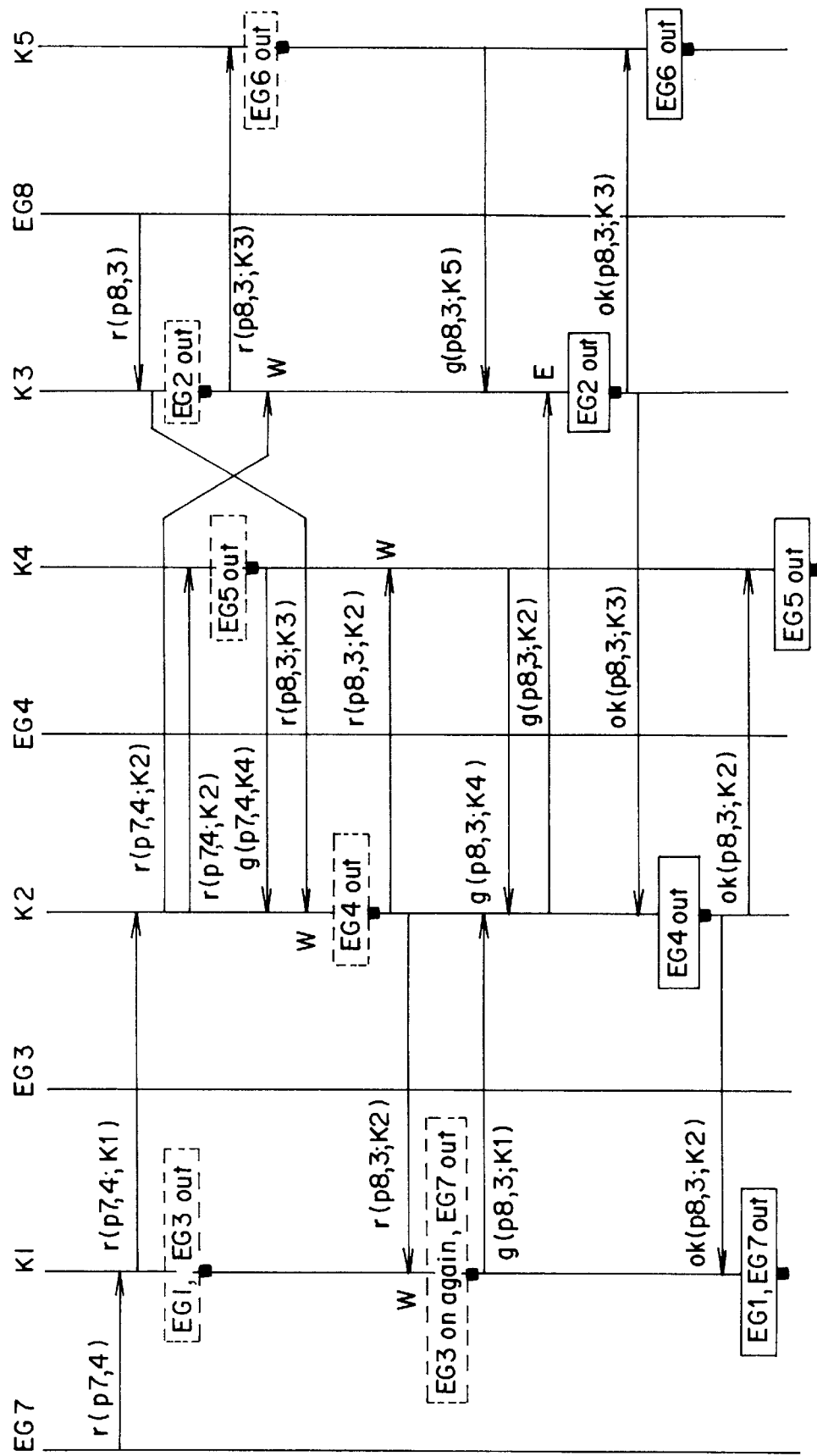
FIG. 3 shows a message diagram for the execution of the method.

In the examples described thus far, it was assumed that the disconnection of the remaining terminals required to establish a desired exclusive connection between two terminals takes place when a request has prevailed in the interlinking network and the message ok is sent to all affected nodes in the network. In another embodiment each node disconnects the terminals after receipt of a request and transfers the request to the next node(s). If a "stronger" request arrives in a node at a later point in time as a result of using the criteria in a case of a collision, the node disconnects the respective terminals and, if needed, activates the terminals that had been disconnected. This is illustrated in FIG. 3, whereby the connection or disconnection in nodes K1 to K5 of connected terminals is illustrated in dotted frames. "EG out" thereby refers to disconnecting the terminals and "EG on" or "EG on again" to activate it. The terminals EG1 and EG3 are thus disconnected in node K1 due to the request r(p 7,4). Due to the request r(p 8,3) prevailing as described in the interlinking the terminal EG3 is then re-activated, and the terminal EG7 is disconnected, thereby establishing an exclusive connection between the terminals EG8 and EG3. In this variation of the method, the sending of a message ok is not required after reaching the stable state of the interlinking network, what reduces the message flow.

The application of the method is not limited to the illustrated example of a telecommunications network. It can be used universally in networks with terminals that can be connected with each other via the network and of which all, with the exception of two, have to be temporarily disconnected. In particular, an application is conceivable in a computer network where all connections to other computers have to be disconnected for the transmission of data between two certain computers in order to enable an uninterrupted and expedient transmission.

What is claimed is:

1. A method for operating a network, which comprises:
   providing a network having a plurality of transmission nodes and a first terminal, a second terminal, and another terminal connected to each other through the plurality of transmission nodes;

first sending, from the first terminal a request to communicate confidentially with the second terminal;

receiving the request at a first node of the plurality of nodes;

forwarding the request from the first node to others of the plurality of nodes;

replying with a respective confirmation signal, from each of the plurality of nodes, after receiving a confirmation signal from each node sent the request by the respective node;

second sending, from the first node, responsive to receiving the confirmation signal from the others of the plurality of nodes to which the first node forwarded the request, a disconnection signal to the others of the plurality of nodes; and disconnecting any terminal linked to the connection except the first terminal and the second terminal.

2. The method of claim 1, further comprising each of said plurality of nodes, after said first sending, rejecting subsequent requests to establish a confidential connection while said first request is being processed.

3. The method of claim 1, further comprising selecting, in accordance with a predetermined criteria, a single request for a confidential connection at any of said plurality of nodes from multiple requests are received at said any of said plurality of nodes within a predetermined time.

4. The method of claim 3, wherein a rank of said first and second terminals is used as said criterion.

5. The method of claim 1, further comprising:

placing said any of said plurality of terminals linked to said connection except said first and second terminals in a holding state;

reconnecting disconnected ones of said plurality of terminals responsive to a request by at least one of said first and second terminals.

6. The method of claim 1, further comprising signaling said first terminal when said disconnecting is completed.

7. The method of claim 1, further comprising signaling disconnected ones of said plurality of terminals when said disconnecting is completed.

8. The method of claim 1, wherein said replying must occur within a predetermined period of time.

9. An apparatus for performing the method of claim 1, wherein said network includes at least two computers connected to each other.

10. A method for operating a network having a plurality of terminals connected through a plurality of nodes, wherein at least two of said plurality of terminals can link into a connection, said method comprising:

first sending, from a first terminal of said plurality of terminals, a request to communicate confidentially with a second terminals of said plurality of terminals which is also linked to said connection;

receiving said request at one of said plurality of nodes;

forwarding said request from said one of said plurality of nodes to others of said plurality of nodes;

disconnecting, at each of said plurality of nodes, any of said plurality of terminals links to said connection except said first and second terminals, responsive to receipt of said request; and replying with a confirmation signal, from each of said plurality of nodes, when those of said plurality of nodes that said each of said nodes forwarded said request to, reply with a confirmation signal.

11. A system for operating a network, comprising:

a plurality of transmission nodes;

a plurality of terminals, a first terminal and a second terminal of said plurality of terminals forming a connection through at least one of said plurality of transmission nodes and communicating through said connection, and other of said plurality of terminals linking into said connection;

said first terminal issuing a request, to a first node of said plurality of nodes, to communicate confidentially with said second terminal;

each of said plurality of nodes receiving the request and forwarding the request to other nodes of said plurality of nodes;

each of said plurality of nodes replying with a confirmation after receiving a confirmation from each of said plurality of nodes sent the request by the respective node;

said first node sending a disconnection signal to the remaining nodes of said plurality of nodes after receiving the confirmation from the nodes previously sent the request by said first node; and each of said plurality of nodes disconnecting any of said plurality of terminals linked to said connection except said first terminal and said second terminal after receiving the disconnection signal.

12. The system of claim 11, further comprising each of said plurality of nodes, after forwarding said request, being capable of rejecting subsequent requests to establish a confidential connection while said request is active.

13. A system for operating a network, comprising:

a plurality of transmission nodes;

a plurality of terminals, a first terminal and a second terminal of said plurality of terminals forming a connection through at least one of said plurality of transmission nodes and communicating through the connection, and other of said plurality of terminals linking into said connection;

said first terminal issuing a request, to a first node of said plurality of nodes, to communicate confidentially with said second terminal;

each of said plurality of nodes receiving said request disconnecting any of said plurality of terminals linked to the connection except said first terminal and said second terminal after receiving the request, and forwarding the request to other nodes of said plurality of nodes; and each of said plurality of nodes replying with a confirmation signal after receiving the confirmation signal from said nodes sent the request by that respective node.

14. The system of claim 11, further comprising said plurality of nodes being capable of selecting, in accordance with a predetermined criteria, a single request for a confidential connection at any of said plurality of nodes if multiple requests are received at said any of said plurality of nodes within a predetermined time.

15. The system of claim 14, wherein a rank of said first and second terminals is used as said criterion.

16. The system of claim 11, wherein said plurality of nodes place said plurality of terminals linked to said connection except said first and second terminals in a holding state, and reconnect disconnected ones of said plurality of terminals responsive to a request issued by at least one of said first and second terminals.

\* \* \* \* \*